United States Patent
Ibi

(10) Patent No.: US 12,403,598 B2
(45) Date of Patent: Sep. 2, 2025

(54) SYSTEM, MANUFACTURING METHOD, CONTROLLING METHOD, PROGRAM, AND RECORDING MEDIUM

(71) Applicant: CANON KABUSHIKI KAISHA, Tokyo (JP)

(72) Inventor: Toshio Ibi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 17/666,328

(22) Filed: Feb. 7, 2022

(65) Prior Publication Data

US 2022/0250243 A1   Aug. 11, 2022

(30) Foreign Application Priority Data

Feb. 10, 2021 (JP) ................................ 2021-020053
Nov. 19, 2021 (JP) ................................ 2021-188735

(51) Int. Cl.
*B25J 9/16* (2006.01)
*B25J 19/02* (2006.01)

(52) U.S. Cl.
CPC ............ *B25J 9/1664* (2013.01); *B25J 19/02* (2013.01)

(58) Field of Classification Search
None
See application file for complete search history.

(56) References Cited

U.S. PATENT DOCUMENTS

| | | | |
|---|---|---|---|
| 9,592,608 B1 | 3/2017 | Bingham et al. | |
| 9,737,991 B2 * | 8/2017 | Takahashi | B25J 9/1694 |
| 2011/0126660 A1 | 6/2011 | Lauzier et al. | |
| 2016/0001275 A1 | 1/2016 | Goto et al. | |
| 2016/0207197 A1 | 7/2016 | Takahashi et al. | |
| 2016/0243700 A1 | 8/2016 | Naitou et al. | |
| 2016/0243705 A1 | 8/2016 | Naitou et al. | |
| 2017/0066130 A1 * | 3/2017 | Corkum | B25J 9/1676 |
| 2019/0126476 A1 * | 5/2019 | Nakamura | B25J 9/1676 |

(Continued)

FOREIGN PATENT DOCUMENTS

| | | |
|---|---|---|
| JP | H10-329071 A | 12/1998 |
| JP | 2005-014133 A | 1/2005 |

(Continued)

OTHER PUBLICATIONS

Wolf et al.; "Towards a Robust Variable Stiffness Actuator"; IEEE/RSJ International Conference on Intelligent Robots and Systems (IROS); Nov. 3-7, 2013. Tokyo, Japan; pp. 5410-5417.

*Primary Examiner* — Adam R Mott
*Assistant Examiner* — Alan Lindsay Ostrow
(74) *Attorney, Agent, or Firm* — Canon U.S.A., Inc. IP Division

(57) ABSTRACT

In a system including a robot and a controller controlling the robot, the controller switches the robot from a first state to a second state in which orientation change in accordance with external force applied to the robot is more tolerated than the first state based on detection of contact of an object with the robot. The controller switches the robot from the second state to a third state in which the orientation change in accordance with the external force is more restricted than the second state after the orientation change in accordance with the external force applied to the robot is started and while the external force is being applied to the robot.

34 Claims, 7 Drawing Sheets

(56) References Cited

U.S. PATENT DOCUMENTS

| | | | |
|---|---|---|---|
| 2019/0145798 A1* | 5/2019 | Kamiya | G01D 5/2405 |
| | | | 700/258 |
| 2020/0130187 A1 | 4/2020 | Iwayama | |
| 2020/0130200 A1* | 4/2020 | Adachi | B25J 13/085 |
| 2020/0147787 A1 | 5/2020 | Takahashi | |
| 2020/0282558 A1* | 9/2020 | Kim | B25J 9/1607 |
| 2020/0298396 A1* | 9/2020 | Yoshimi | B25J 9/12 |
| 2021/0089040 A1* | 3/2021 | Ebrahimi Afrouzi | |
| | | | G05D 1/0248 |
| 2021/0107135 A1* | 4/2021 | Takeuchi | G05B 19/423 |
| 2021/0237261 A1* | 8/2021 | Kinoshita | B25J 9/0081 |

FOREIGN PATENT DOCUMENTS

| | | |
|---|---|---|
| JP | 2016-132080 A | 7/2016 |
| JP | 2016153156 A | 8/2016 |
| JP | 2020001137 A | 1/2020 |
| JP | 2020-049592 A | 4/2020 |
| JP | 2020082199 A | 6/2020 |

\* cited by examiner

SYSTEM, MANUFACTURING METHOD, CONTROLLING METHOD, PROGRAM, AND RECORDING MEDIUM

BACKGROUND OF THE INVENTION

Field of the Invention

The present disclosure relates to a robot and a robot system.

Description of the Related Art

Robots are required to perform flexible operations, such as cooperative works with human beings, in recent years.

In use of the robots, the robots may be decelerated or stopped in response to contact of human beings with the robots. However, remaining of the decelerated or stopped robots in areas where the human beings work may impede the works of the human beings.

Japanese Patent Laid-Open No. 2016-153156 discloses a robot system that instructs a robot to perform an evacuation operation in which, if external force detected by an external force detection unit is greater than a first threshold value, the robot is moved in a direction in which the external force is decreased.

SUMMARY OF THE INVENTION

The present disclosure provides a system including a robot and a controller controlling the robot. The controller switches the robot from a first state to a second state in which orientation change in accordance with external force applied to the robot is more tolerated than the first state based on detection of contact of an object with the robot. The controller switches the robot from the second state to a third state in which the orientation change in accordance with the external force applied to the robot is more restricted than the second state after the orientation change in accordance with the external force is started and while the external force is being applied to the robot.

Further features of the present invention will become apparent from the following description of exemplary embodiments with reference to the attached drawings.

DESCRIPTION OF THE EMBODIMENTS

Figure 1:
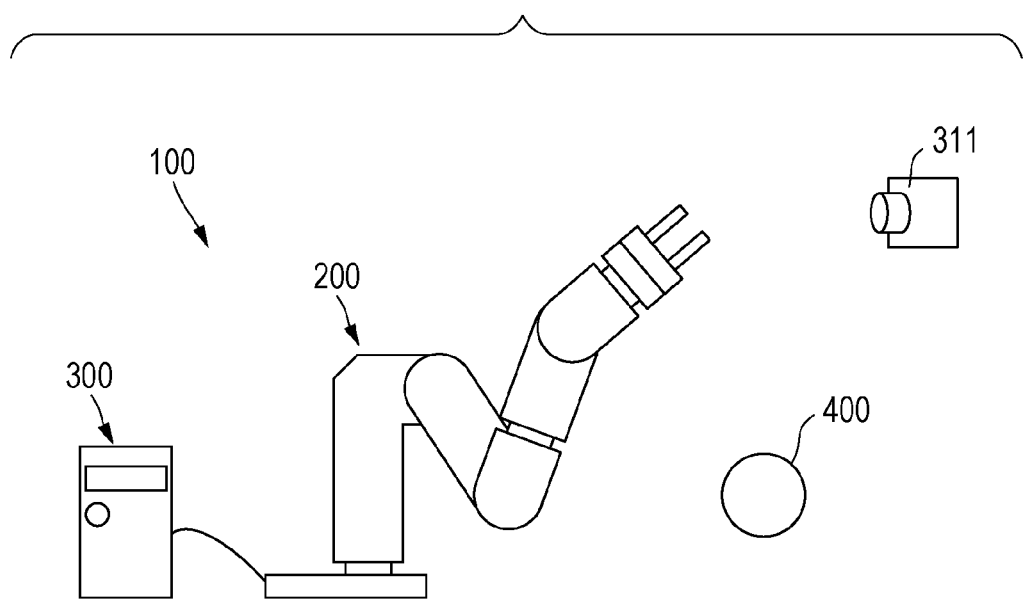
FIG. 1 is a diagram schematically illustrating the configuration of a system according to a first embodiment.

Embodiments of the present disclosure will herein be described with reference to the drawings. However, the embodiments described below are only examples and the present disclosure is not limited to these embodiments. In the following description and drawings, the same reference numerals are added to the components common to multiple drawings. The common components are described with reference to the multiple drawings and a description of the components to which the same reference numerals are added is appropriately omitted herein. Different matters having the same name may be discriminated from each other by adding ordinal numbers, such as a first matter and a second matter.

In the robot system disclosed in Japanese Patent Laid-Open No. 2016-153156, the robot may collide with an obstacle if the obstacle exists on an evacuation path of the robot evacuating in a direction in which the external force is decreased.

In addition, continuation of the evacuation by the robot may cause the robot to reach a singular orientation or may cause the evacuation speed of the robot to be excessively increased in response to excessive increase of the external force applied to the robot.

The present disclosure provides a technique that is advantageous to improvement of the operation of a robot when external force applied to the robot is detected.

First Embodiment

A robot system (hereinafter referred to as a system) according to a first embodiment will now be described with reference to FIG. 1 and FIG. 2. FIG. 1 is a diagram schematically illustrating the configuration of the system according to the first embodiment when the system is viewed from the side. A system 100 according to the first embodiment includes a robot 200 and a controller 300 that controls the robot 200.

Figure 2:
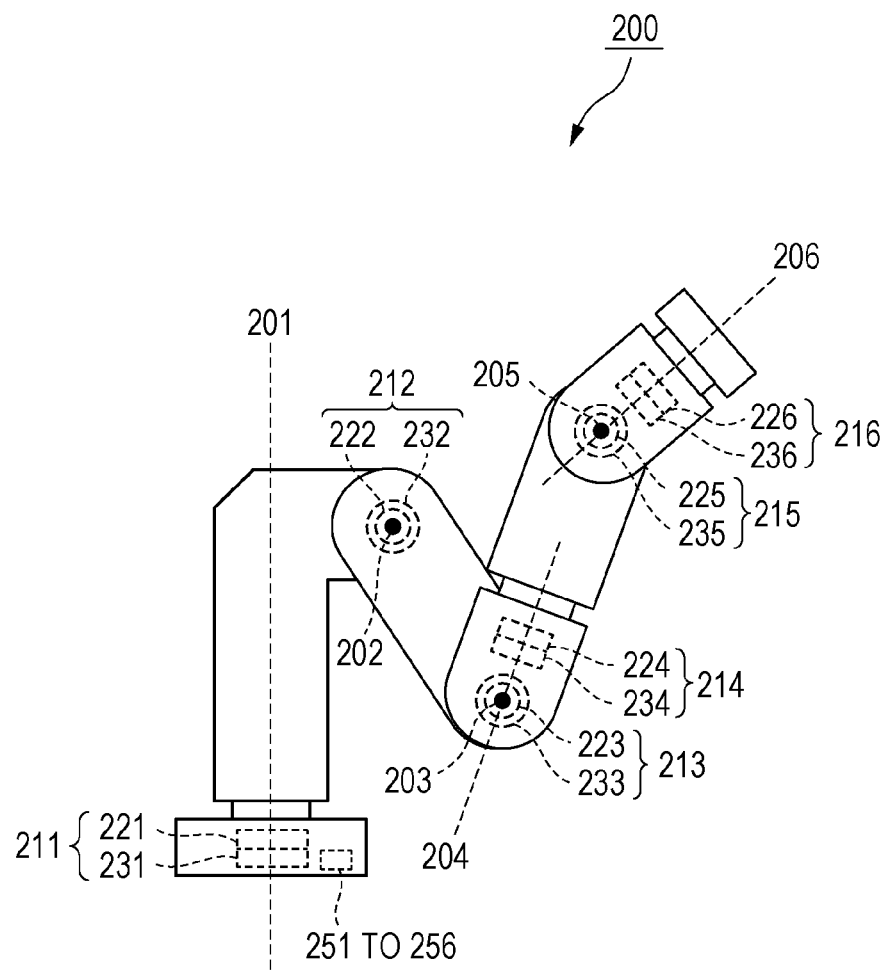
FIG. 2 is a cross-sectional view of a robot according to the first embodiment.

FIG. 2 is a cross-sectional view of the robot 200 according to the first embodiment. The robot 200 according to the first embodiment includes multiple joint units 211 to 216. The joint units 211 to 216 include multiple servo motors 221 to 226 that drive multiple joint shafts 201 to 206 and multiple contact detection sensors 231 to 236, respectively. The contact detection sensors 231 to 236 may be connected to the servo motors 221 to 226 or may not be connected the servo motors 221 to 226, respectively. The multiple joint units 211 to 216 may include brakes (not illustrated).

The robot 200 in the first embodiment includes servo control units 251 to 256. The servo motors 221 to 226 are controlled by the servo control units 251 to 256, respectively.

Although the servo motors 221 to 226 may include electric motors and encoders, it sufficient to use servo motors in the related art and the servo motors 221 to 226 may be appropriately varied. The encoders in the servo motors 221 to 226 may be used as the contact detection sensors 231 to 236, respectively. Although the contact detection sensors 231 to 236 are provided in the joint units 211 to 216, respectively, in the first embodiment, the contact detection sensors 231 to 236 may be provided outside the robot 200.

The servo control units 251 to 256 supplies current to the electric motors in the servo motors 221 to 226 and the electric motors performs driving based on the current supplied from the servo control units 251 to 256. The robot 200 can change the orientation upon driving of the electric motors. Although the example is described in which the servo control units 251 to 256 are provided in a base of the robot 200, the servo control units 251 to 256 may be provided in the joint units 211 to 216, respectively, of the robot 200. The servo control units 251 to 256 may be provided in the controller 300.

The joint units 211 to 216 support the deadweight of the robot 200 that is turned on based on the current supplied from the servo control units 251 to 256. In other words, the electric motors prevent the robot 200 from changing the orientation due to the gravity applied to each component of the robot 200. At this time, the joint shafts 201 to 206 are not fixed.

The brakes included in the joint units 211 to 216 prevent the robot 200 that is turned off from changing the orientation due to the deadweight. The brakes fix the joint shafts 201 to 206 to inhibit the robot 200 from changing the orientation.

The brakes release the fixing of the joint shafts 201 to 206 when the robot 200 is turned on and is in a control state in which the joint units 211 to 216 support the deadweight of the robot 200 that is turned on based on the current supplied from the servo control units 251 to 256. In contrast, when the robot 200 is turned off or when the robot is in a state in which the deadweight of the robot 200 is not supported in response to a control stop instruction or the like, the brakes fix the joint shafts 201 to 206. The brakes included in the joint units 211 to 216 are, for example, electromagnetic brakes, such as deenergization brakes.

It is sufficient for the respective contact detection sensors 231 to 236 to be sensors that are capable of detecting contact of an object 400 (contact object) with the robot 200. The respective contact detection sensors 231 to 236 desirably detect the physical quantity corresponding to external force applied to the robot 200 due to the contact of the contact object with the robot 200. It is sufficient for the respective contact detection sensors 231 to 236 to determine whether the robot 200 has any contact object and to be provided either in the robot 200 or outside the robot 200. For example, the contact detection sensors 231 to 236 may be provided on the joint shafts 201 to 206, respectively, of the robot 200 and may be force sensors (torque sensors) that detect torque around the joint shafts 201 to 206, respectively, which is varied with the external force. Alternatively, the contact detection sensors 231 to 236 may be provided on the joint shafts 201 to 206, respectively, of the robot 200 and may be force sensors (pressure sensors) that detect pressure in directions intersecting with the joint shafts 201 to 206, respectively, which is varied with the external force. Alternatively, the respective contact detection sensors 231 to 236 may be provided in the robot 200 or the controller 300 and may be current sensors that detect current flowing through the multiple servo motors 221 to 226, which is varied with the external force. Alternatively, the respective contact detection sensors 231 to 236 may be provided in an outer package of the robot 200 and may be tactile sensors that detect any contact with the robot 200. Alternatively, the respective contact detection sensors 231 to 236 may be provided outside the robot 200 and may be visual sensors (vision sensors) that detect any contact of the object 400 with the robot 200 through image processing.

One contact detection sensor may be provided or the multiple contact detection sensors may be provided.

The controller 300 will now be described with reference to FIG. 3.

Figure 3:
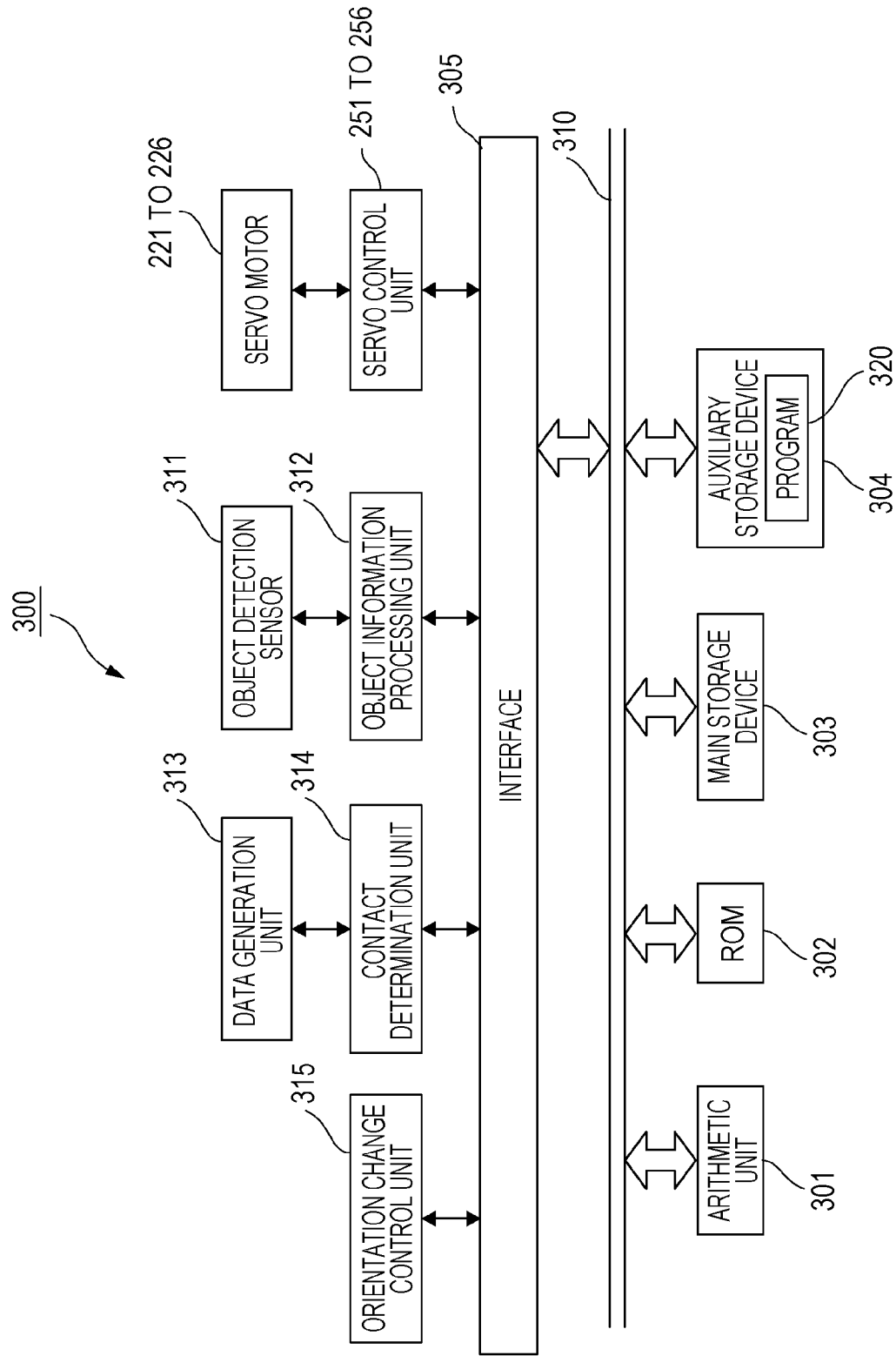
FIG. 3 is a block diagram illustrating the configuration of a controller according to the first embodiment.

FIG. 3 is a block diagram illustrating the configuration of the controller 300 according to the first embodiment.

The controller 300 is composed of a computer and includes an arithmetic unit 301 serving as a control unit. The arithmetic unit 301 is a central processing unit (CPU), an application specific integrated circuit (ASIC), or a field programmable gate array (FPGA). The controller 300 includes a read only memory (ROM) 302 and a main storage device 303, such as a random access memory (RAM), which serve as storage units. A basic program, such as a basic input output system (BIOS), is stored in the ROM 302. The main storage device 303 is a storage device that temporarily stores a variety of data, such as a result of arithmetic processing in the arithmetic unit 301. The controller 300 includes an auxiliary storage device 304, such as a hard disk drive (HDD) or a solid state drive (SSD), which serves as a storage unit. The auxiliary storage device 304 stores the result of arithmetic processing in the arithmetic unit 301 and data acquired from the outside of the controller 300. The controller 300 further includes an interface 305.

The ROM 302, the main storage device 303, the auxiliary storage device 304, and the interface 305 are connected to the arithmetic unit 301 via a bus 310. The servo control units 251 to 256 in the robot 200 are connected to the interface 305. An operation device, such as an operation panel or a teaching pendant, a display device, such as a display or a lamp, and so on may be connected to the interface 305. An information input unit for inputting information into the controller 300 may be included in the interface 305. The operation device is connected to the information input unit in the controller 300 through wired connection and/or wireless connection. The connection of the operation device to the controller 300 in the above manner enables the controller 300 to be operated with the operation device. An information output unit that outputs information to be displayed in the display device may be included in the interface 305 as a display unit for displaying information in the display device. The information output unit may include a graphic controller and a microcomputer. The connection of the display device to the controller 300 in the above manner enables the information to be displayed in the display device.

The arithmetic unit 301 performs a variety of processing to operate the robot 200 based on a program 320 stored in the auxiliary storage device 304. In the processing, the arithmetic unit 301 issues an instruction to move the robot 200 to a desired position, that is, an instruction to change the robot 200 to a desired orientation. Data about the positional instruction is supplied to the servo control units 251 to 256 in the robot 200 via the bus 310 and the interface 305 at predetermined time intervals.

When the robot 200 changes the orientation, the arithmetic unit 301 issues the instruction to move the robot 200 to a desired position. The servo control units 251 to 256 apply current to the joint units 211 to 216 in the robot 200 based on the positional instruction to the robot 200 to control the driving of the electric motors. Controlling the driving of the electric motors enables the orientation change of the robot 200 to be controlled.

Impedance control can be used in the control of the robot 200. The controller 300 is capable of changing the orientation of the robot 200 while changing response characteristics to the external force by performing the impedance control to the robot 200. In other words, varying rigidity and viscosity, which are parameters in the impedance control, enables the orientation of the robot 200 to be changed while varying the sense of force of a person when the person applies the external force to the robot 200.

The sense of force of a person is, for example, a sense in which the person feels that it is difficult to change the orientation or the person feels that it is easy to change the orientation when the person applies the external force to the robot 200.

The rigidity parameter and the viscosity parameter, which are the parameters in the impedance control, will now be described using an equation of the impedance control. The equation of the impedance control is represented by Equation (1):

$$F = M d^2 x/dt^2 + D dx/dt + K x \qquad (1)$$

In Equation (1), F denotes the external force which the person applies to the robot 200, x denotes displacement of the position of the robot 200, d/dt denotes derivative with respect to time, M denotes an inertia parameter in the impedance control, D denotes the viscosity parameter in the impedance control, and K denotes the rigidity parameter in the impedance control.

How the orientation change of the robot 200 is influenced by a variation in the rigidity parameter in the equation of the impedance control will now be described. Accordingly, in Equation (1), M=0 and D=0. The equation in the impedance control in this case is represented by Equation (2):

$$F = K x \qquad (2)$$

Equation (2) indicates that the variation in the rigidity parameter K is capable of varying the degree of displacement of each component of the robot 200 by the external force applied to the robot 200 by the person. When the rigidity parameter K is increased, the displacement of the orientation change of each component of the robot 200 due to the external force is decreased. In contrast, when the rigidity parameter K is decreased, the displacement of the orientation change of each component of the robot 200 due to the external force is increased.

How the orientation change of the robot 200 is influenced by a variation in the viscosity parameter in the equation of the impedance control will now be described. Accordingly, in Equation (1), M=0 and K=0. The equation in the impedance control in this case is represented by Equation (3):

$$F = D dx/dt \qquad (3)$$

Equation (3) indicates that the variation in the viscosity parameter D is capable of varying the speed of the orientation change of each component of the robot 200 from the current orientation to a target orientation by the external force applied to the robot 200 by the person. When the viscosity parameter D is increased, the speed of the orientation change of each component of the robot 200 due to the external force is decreased. In contrast, when the viscosity parameter D is decreased, the speed of the orientation change of each component of the robot 200 due to the external force is increased.

Varying the rigidity, which is a parameter in the impedance control, enables the displacement of the orientation change of the robot 200 due to the external force applied to the robot 200 to be varied, and varying the viscosity, which is a parameter in the impedance control, enables the speed of the orientation change of the robot 200 due to the external force applied to the robot 200 to be varied.

How the orientation change of the robot 200 is influenced by a variation in the inertia parameter in the equation of the impedance control will now be described. Accordingly, in Equation (1), D=0 and K=0. The equation in the impedance control in this case is represented by Equation (4):

$$F = M d^2 x/dt^2 \qquad (4)$$

Equation (4) indicates that the variation in the inertia parameter M is capable of varying the acceleration of the orientation change of each component of the robot 200 by the external force applied to the robot 200 by the person. When the inertia parameter M is increased, the acceleration of the orientation change of each component of the robot 200 due to the external force is decreased. In contrast, when the inertia parameter M is decreased, the acceleration of the orientation change of each component of the robot 200 due to the external force is increased. However, in the impedance control of the first embodiment, the control of the orientation change of the robot 200 by the variation in the inertia parameter is not performed.

Increasing the rigidity or the viscosity in the impedance control makes the person feel that the orientation change of the robot 200 is difficult when the person applies the external force to the robot 200. In contrast, decreasing the rigidity or the viscosity in the impedance control makes the person feel that the orientation change of the robot 200 is easy when the person applies the external force to the robot 200.

For example, when the external force greater than a predetermined value is detected by the force sensor, increasing the rigidity or the viscosity in the impedance control enables the orientation change to be restricted.

Performing the impedance control enables the resistance against the external force to be increased or decreased in the orientation change of the robot 200 in response to the external force applied by the person. This helps the person determine whether the external force is to be continuously applied.

Although the basic configuration to control the orientation of the robot 200 in the system 100 is described above, the configuration may be appropriately changed using a common technology or may be appropriately improved using a technology that is not common.

The configuration concerning the detection of the object 400 that may exist around the robot 200 will now be described.

The controller 300 may include an object information processing unit 312, a data generation unit 313, a contact determination unit 314, and an orientation change control unit 315. In the controller 300, the object information processing unit 312, the contact determination unit 314, the data generation unit 313, and the orientation change control unit 315 are connected to the interface 305. At least one of the object information processing unit 312, the contact determination unit 314, and the orientation change control unit 315 may be provided in the robot 200. For example, the data generation unit 313 may be provided in each of the joint units 211 to 216.

The data generation unit 313 generates data (analog data or digital data) which the data generation unit 313 is capable of processing from the signals that are detected and output from the contact detection sensors 231 to 236 and supplies the generated data to the contact determination unit 314. The value indicated by the data generated by the data generation unit 313 is a value corresponding to the physical quantity detected by the contact detection sensors 231 to 236. The data generation unit 313 may be called a contact detection unit.

The contact determination unit 314 analyzes contact information output from the data generation unit 313, provided in the controller 300 or outside the controller 300, to determine the presence of the contact object with the robot 200.

An object detection sensor 311 may be provided in the system 100 or outside the system 100.

The object detection sensor 311 is a sensor that is capable of detecting an object existing around the robot 200. Various sensors including an image sensor, a ranging sensor, an ultrasonic sensor, and a radar sensor may be used as the object detection sensor 311. The ranging sensor may be a Time of Flight (ToF) sensor. The object detection sensor 311 is connected to, for example, the interface 305.

The object information processing unit 312 analyzes object information output from the object detection sensor 311.

The object information processing unit 312 is capable of determining the object 400 existing in an area where the robot 200 is movable (hereinafter referred to as a movable area) and calculating the distance to the object 400.

The orientation change control unit 315 controls the orientation change based on data about the object existing in the movable area of the robot 200 in the object information processing unit 312 and data about the presence of the contact object in the contact determination unit 314.

The system 100 of the first embodiment is capable of detecting the contact of the object with the robot 200 using the contact detection sensors 231 to 236. The controller 300 is capable of controlling the robot 200 based on the detection of the contact. In addition, the controller 300 is capable of detecting the existence of the object 400 around the robot 200 using the object detection sensor 311. Furthermore, the controller 300 is capable of controlling the robot 200 based on the detection of the existence of the object 400.

Second Embodiment

The operation of the system 100 will now be described with reference to FIG. 4 as a second embodiment. Although the system 100 described in the first embodiment can be used in the second embodiment, the system 100 described in the second embodiment is not limited to the system 100 of the first embodiment.

Figure 4:
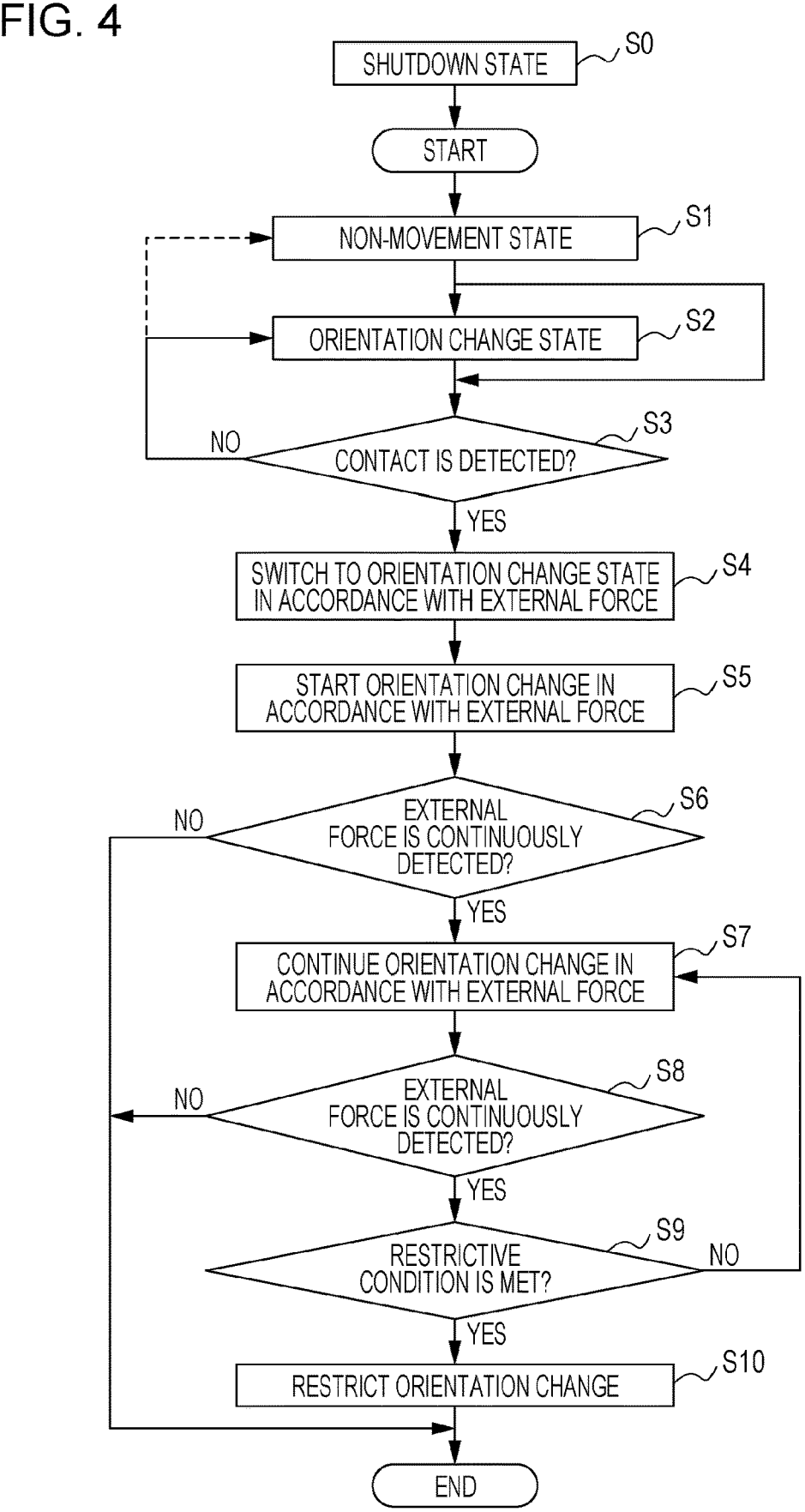
FIG. 4 is a flowchart illustrating the content of control in the system in a second embodiment.

FIG. 4 is a flowchart illustrating the main portion of an operational process performed in the system 100 in the second embodiment.

Referring to FIG. 4, in Step S0, the robot 200 is turned off and the joint shafts 201 to 206 are fixed by the brakes included in the joint units 211 to 216 to be in a shutdown state.

The robot 200 is turned on to start the operation of the system 100.

In Step S1, the brakes are released and the joint shafts 201 to 206 are not fixed with the brakes. However, the robot 200 is in a non-movement state. The non-movement state in Step S1 is a state in which the electric motors support the deadweight of the robot 200. In other words, the non-movement state is a state in which the electric motors prevent the robot 200 from changing the orientation due to the gravity applied to each component of the robot 200. It is assumed in Step S1 that the external force is not applied to the robot 200. When the external force is applied to the robot 200 the deadweight of which is supported at this time, the orientation change is not performed. The fact that the robot 200 is in the state in which the orientation change is not performed in response to the external force may be indicated using a graphical user interface (GUI) or a lamp to enable determination of whether the orientation change is available. The robot 200 may enter a state in which the orientation change is performed in response to a specific operation performed by the user in advance. The specific operation is, for example, depression of a button or setting of mode change. In the following description, the external force applied to the robot 200 is artificial force applied to the robot 200, excluding the gravity applied to the deadweight of the robot 200 and non-artificial force, such as atmospheric pressure, applied to the robot 200. The non-movement state of the robot 200 means a state in which the robot 200 keeps the orientation. The state in which the robot 200 keeps the orientation (stopped state) may include both the shutdown state in Step S0 and the non-movement state in Step S1.

In Step S2, the control of the robot 200 by the controller 300 is performed and the robot 200 is in a state in which the robot 200 is changing the orientation (orientation change state). The state in Step S2 may be a state in which the controller 300 changes the orientation of the robot 200 based on an orientation change instruction stored in the controller 300. Alternatively, the state in Step S2 may be a state in which the controller 300 changes the orientation of the robot 200 based on an instruction from the user with the operation device.

Step S2 may be omitted and the process may go to Step S3 from the non-movement state in Step S1. Although the state immediately before Step S3 is the non-movement state in Step S1 or the orientation change state in Step S2, no external force may be applied to the robot 200 in both cases. The state immediately before Step S3 is a state in which the orientation change of the robot 200 in accordance with the external force is restricted even if the external force is applied to the robot 200. In other words, in the non-movement state in Step S1 or the orientation change state in Step S2, the orientation of the robot 200 is hardly changed even if the user attempts to change the orientation of the robot 200 by applying the external force to the robot 200. The state immediately before Step S3 may be collectively referred to as a first state.

In Step S3, the respective contact detection sensors 231 to 236 detect the external force applied to the robot 200 in the first state. In addition, the contact determination unit 314 determines whether the external force applied to the robot 200 is determined to be contact.

The controller 300 is set so that it is determined that the robot 200 has any contact object if the external force detected in Step S3 has a magnitude F1. As a result, the contact determination unit 314 determines that the robot 200 has the contact object. The controller 300 is set so that it is determined that the robot 200 has no contact object if the external force detected in Step S3 has a magnitude F2 smaller than the magnitude F1. As a result, the contact determination unit 314 determines that the robot 200 has no contact object.

Specifically, a threshold value corresponding to a magnitude F3 of the external force is set and it is determined whether the robot 200 has any contact object based on whether the external force detected in Step S3 has a magnitude greater than the magnitude F3, which is the threshold value.

The magnitude F3, which is the threshold value, is smaller than the magnitude F1 and is greater than the magnitude F2 (F1>F3>F2). Whether the robot 200 is determined to have any contact object or no contact object if the external force equal to the magnitude F3, which is the threshold value, is detected may be appropriately set.

For example, a method of detecting the torque around the joint shafts 201 to 206, a method of detecting the variation in flowing current, or a method of detecting whether the robot 200 has any contact object using the visual sensor is used as the method of detecting the external force.

If the respective contact detection sensors 231 to 236 detect the external force applied to the robot 200 in the first state in Step S3, the contact determination unit 314 determines whether the external force is determined to be contact. The external force applied to the robot 200 in the first state means the external force that is applied by the object 400 around the robot 200 through contact with the robot 200. The object 400 around the robot 200 is a facility (a fixed object or a movable object) other than the robot, which exists in the space in which the robot 200 is installed. For example, the object 400 may be a person.

If the respective contact detection sensors 231 to 236 detect the external force applied to the robot 200 in the first state, the data generation unit 313 supplies data based on the outputs from the contact detection sensors 231 to 236 to the contact determination unit 314. The contact determination unit 314 determines whether the detected external force is greater than a first threshold value to determine whether the robot 200 has any contact object.

When the contact detection sensors 231 to 236 are the torque sensors, the data generation unit 313 can generate the torque value from the amounts of output from the contact detection sensors 231 to 236. In this case, the contact determination unit 314 determines whether the torque value corresponding to the amounts of output from the respective contact detection sensors 231 to 236 exceeds a predetermined torque value (the first threshold value).

When the contact detection sensors 231 to 236 are the current sensors, the data generation unit 313 generates the current value from the amounts of current flowing through the electric motors. In this case, the contact determination unit 314 determines whether the current value corresponding to the amounts of current flowing through the respective electric motors exceeds a predetermined current value (the first threshold value).

If the output value from the data generation unit 313 exceeds a predetermined value (the first threshold value), the contact determination unit 314 determines that the robot 200 has the contact object. If the output value from the data generation unit 313 does not exceed the predetermined value (the first threshold value), the contact determination unit 314 determines that the robot 200 has no contact object.

When the contact detection sensors 231 to 236 are the visual sensors, the contact determination unit 314 determines whether the robot 200 has any contact object through the image processing. In this case, Step S3 may be omitted. The first threshold value described above may be set by the user depending on the used method.

The controller 300 is set so that it is determined that the robot 200 has no contact object if the respective contact detection sensors 231 to 236 do not detect the external force in Step S3. This corresponds to No in Step S3 and the process goes back to Step S2 from Step S3.

The controller 300 is set so that it is determined that the robot 200 has no contact object if the external force detected in Step S3 has the magnitude F2 smaller than the first threshold value. This corresponds to No in Step S3 and the process goes back to Step S2 from Step S3.

If the process goes back to Step S2 from Step S3, the robot 200 may not move to the non-movement state (Step S1) and may continuously perform the orientation change in the first state (Step S2). However, if the step immediately before Step S3 is Step S1, the process may go back to Step S1 from Step S3 or may go to Step S2. Also if the step immediately before is Step S3 is Step S2, the process may go back to Step S1 from Step S3.

If the external force detected in Step S3 has the magnitude F1, the contact determination unit 314 determines that the robot 200 has the contact object. If the contact determination unit 314 determines that the robot 200 has the contact object (Yes in Step S3), the process goes to Step S4. In Step S4, the controller 300 switches the robot 200 from the first state to a state in which the orientation change in accordance with the external force is performed.

The controller 300 is capable of changing the orientation of the robot 200 while changing the response characteristics to the external force by performing the impedance control to the robot 200.

In other words, varying the rigidity or the viscosity, which is the parameter in the impedance control, enables the orientation of the robot 200 to be changed while varying the sense of force of the person when the external force is applied to the robot 200.

Decreasing at least one of the rigidity and the viscosity in the impedance control enables the robot 200 in the first state to be switched to the state in which the orientation change in accordance with the external force is available.

The state in which the robot 200 performs the orientation change in accordance with the external force is referred to as a second state.

The second state is a state in which the orientation change in accordance with the external force, which is restricted in the first state, is relieved. The restriction of the orientation change in accordance with the external force in the first state and the relief of the restriction of the orientation change in accordance with the external force in the second state are defined based on the relative relationship between the two states. Specifically, it is sufficient for the orientation change in accordance with the external force in the first state to be more restricted than the orientation change in accordance with the external force in the second state. The state in which the restriction of the orientation change is more relieved than the orientation change in accordance with the external force in the first state is a state in which the restriction of the orientation is tolerated. Accordingly, this does not mean unavailability of the orientation change in accordance with the external force in the first state. For example, the robot 200 may change the orientation in the first state upon application of the external force exceeding the strength of the joint units 211 to 216. It is sufficient for the restriction of the orientation change in accordance with the external force in the second state to be more relieved than the restriction of the orientation change in accordance with the external force in the first state. Accordingly, this does not mean no restriction of the orientation change in accordance with the external force in the second state. For example, also in the second state, the robot 200 can have certain resistance against the external force owing to frictional force or the like, which the joint units 211 to 216 originally have.

In Step S5, the robot 200 in the second state starts the orientation change in accordance with external force applied to the robot 200. Although the external force applied to the robot 200 at this time is desirably detected by the robot 200 with the contact detection sensors 231 to 236, the external force may be detected using another method or the external force may not be detected. The external force applied to the robot 200 in Step S5 is the external force that may occur in the robot 200 in response to pressure force to the robot 200 by the user. Alternatively, the external force applied to the robot 200 in Step S5 is the external force that may occur in the robot 200 in response to pressure force to the robot 200 by a robot different from the robot 200.

In Step S6, it is determined whether the external force applied to the robot 200 in the second state is continuously detected. If it is determined that no external force is detected (NO in Step S6), the robot 200 stops the orientation change in accordance with the external force.

If it is determined that the external force is continuously detected (YES in Step S6), the process goes to Step S7. In Step S7, the robot 200 continues the orientation change in accordance with the external force. Then, the process goes to Step S8.

In Step S8, it is determined again whether the robot 200 continuously detects the external force.

If it is determined that no external force is detected (NO in Step S8), the robot 200 stops the orientation change in accordance with the external force.

If the robot 200 stops the orientation change in Step S6 or Step S8, the controller 300 determines that the person has completed the orientation change of the robot 200 to a desired position. Then, the operational process in FIG. 4 is terminated.

If it is determined that the robot 200 continuously detects the external force (YES in Step S8), the process goes to Step S9. In Step S9, the object information processing unit 312 determines whether the robot 200 meets a restrictive condition. The restrictive condition is a condition used to determine whether the orientation change of the robot 200 is restricted. For example, the orientation change of the robot 200 is restricted, for example, when the robot 200 comes close to the object 400 around the robot 200, when the robot 200 performs the orientation change in accordance with excessive external force or at an excessive speed, or when the robot 200 comes close to a singular point. In addition, the condition to restrict the orientation change of the robot 200 is met, for example, when the robot 200 has travelled a predetermined distance and/or when the robot 200 has performed the orientation change for a predetermined time period. An OR condition may be established between the predetermined-distance travelling and the orientation change for the predetermined time period or an AND condition may be established therebetween.

If the object information processing unit 312 determines that the robot 200 meets the restrictive condition (YES in Step S9), the process goes to Step S10. In Step S10, the controller 300 switches to a state in which the orientation change is more restricted than the second state after the robot 200 has started the orientation change in accordance with the external force and while the external force is being applied to the robot 200 in the second state.

The controller 300 increases at least one of the rigidity and the viscosity in the impedance control to restrict the orientation change of the robot 200.

Increasing at least one of the rigidity and the viscosity in the impedance control enables the orientation change of the robot 200 that is performing the orientation change in accordance with the external force to be restricted.

The state in which the orientation change is more restricted than the second state is referred to as a third state.

The third state is a state in which the orientation change in accordance with the external force, the restriction of which is relieved in the second state, is restricted. The relief of the restriction of the orientation change in accordance with the external force in the second state and the restriction of the orientation change in accordance with the external force in the third state are defined based on the relative relationship between the two states. Specifically, it is sufficient for the orientation change in accordance with the external force in the third state to be more restricted than the orientation change in accordance with the external force in the second state. Accordingly, this does not mean unavailability of the orientation change in accordance with the external force in the third state. For example, the robot 200 may change the orientation in the third state upon application of the external force exceeding the strength of the joint units 211 to 216. It is sufficient for the restriction of the orientation change in accordance with the external force in the second state to be more relieved than the restriction of the orientation change in accordance with the external force in the third state. Accordingly, this does not mean no restriction of the orientation change in accordance with the external force in the second state. For example, also in the second state, the robot 200 can have certain resistance against the external force owing to frictional force or the like, which the joint units 211 to 216 originally have.

The robot 200 in the second state is switched to the third state in Step S10. In other words, the orientation change of the robot 200, which performs the orientation change in accordance with the external force, is restricted. The restriction of the orientation change causes, for example, the orientation change to be stopped and the robot 200 is in the non-movement state. Alternatively, the restriction of the orientation change causes the amount of orientation change caused by the applied external force to be decreased.

It is possible to restrict the orientation change of the robot 200 through the above control.

Third Embodiment

An exemplary flow will now be described with reference to FIG. 5A and FIG. 5B as a flow in a third embodiment. The flow in the second embodiment may be realized using a method other than the flow described in the third embodiment. In addition, the flow in the third embodiment may be realized using a method other than the flow described below with reference to FIG. 5A and FIG. 5B.

Figure 5A:
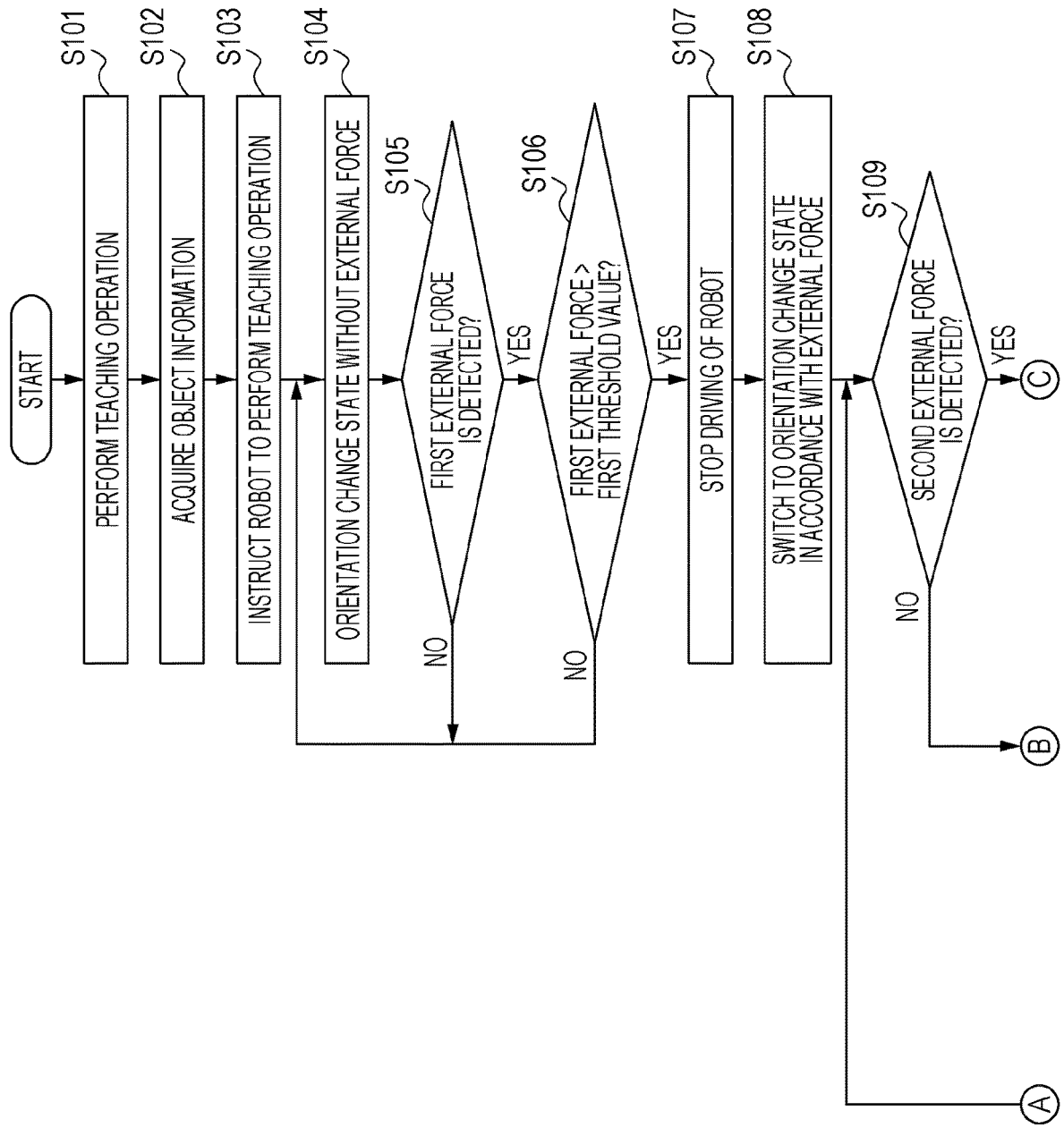
FIG. 5A and FIG. 5B are flowcharts illustrating the content of control in the system in a third embodiment.
Figure 5B:
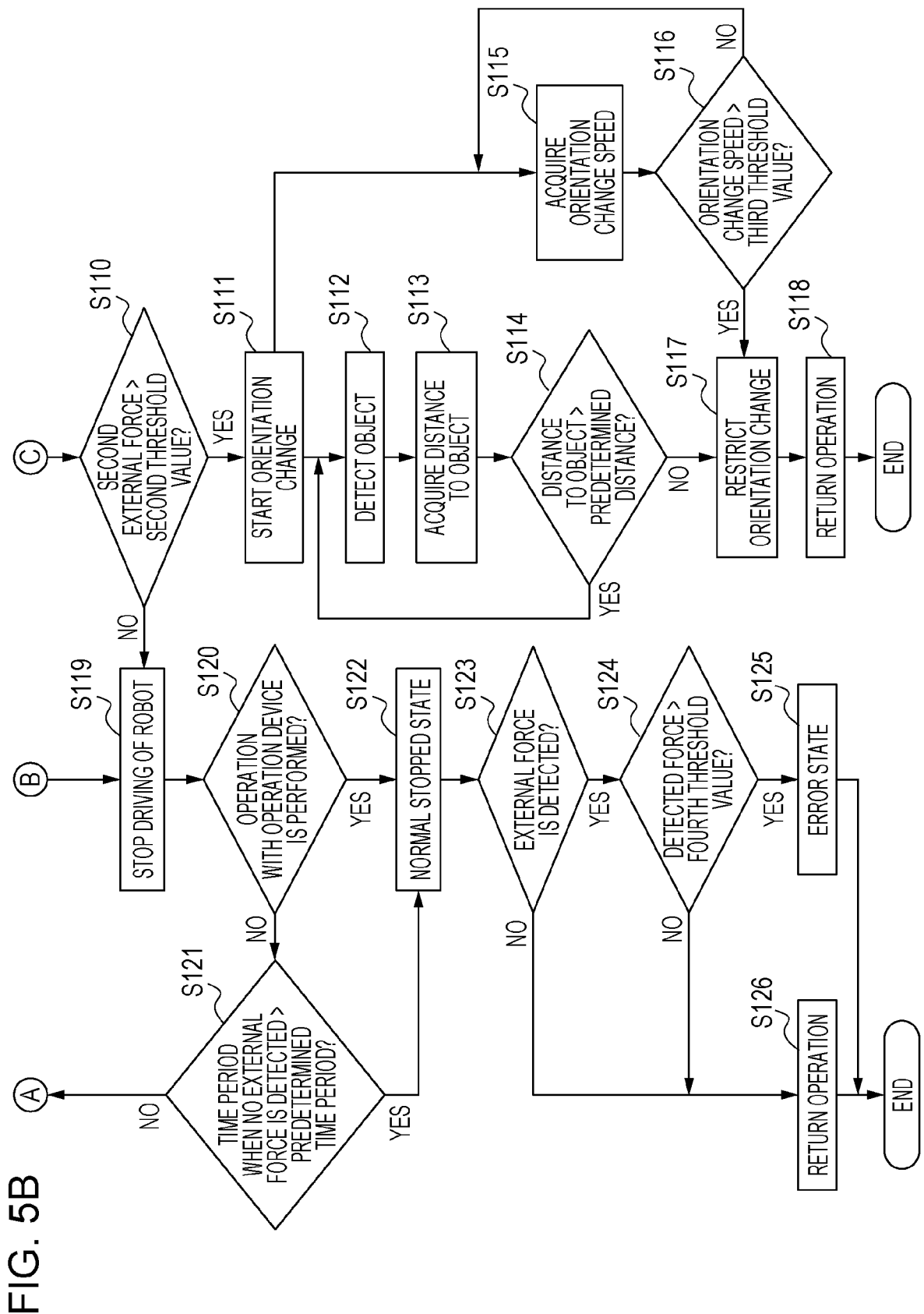

FIG. 5A and FIG. 5B are detailed flowcharts illustrating the operational process performed in the system 100 in the third embodiment.

Referring to FIG. 5A, Step S101 to Step S104 correspond to the flow in Step S2 in the second embodiment.

In Step S101, a teaching operation to cause the robot 200 in the non-movement state to store the operation is performed. At this time, the teaching operation may be performed by the person with the operation device (not illustrated) or may be performed by the person who directly touches the robot 200. Alternatively, an operation file in which operations assumed in advance through simulation or the like are recorded may be stored in the controller 300.

After the teaching is completed, in Step S102, the object information about the object 400 existing in the movable area of the robot 200 is acquired. For example, the image sensor that captures an image around the robot 200 or the object detection sensor, such as the ultrasonic sensor, the optical ToF sensor, or the radar sensor, may be used to acquire the object information. The singular point of the robot 200 is also stored as the object information here.

In Step S103, the person instructs the robot 200 to perform the teaching operation in Step S101. In Step S104, the robot 200 starts the orientation change.

The robot 200 performs the orientation change in a state in which the external force is not applied in Step S104. Although this state is referred to as the first state, the robot 200 may be in various states because the first state is the state before the second state described in the second embodiment.

Step S105 to Step S106 correspond to the flow in Step S3 in the second embodiment. In Step S105, the data generation unit 313 and the contact determination unit 314 determine whether the respective contact detection sensors 231 to 236 detect first external force applied to the robot 200 in the first state.

If the data generation unit 313 and the contact determination unit 314 determine that the respective contact detection sensors 231 to 236 detect the first external force applied to the robot 200 in the first state (YES in Step S105), the data generation unit 313 and the contact determination unit 314 acquire the contact information. Then, the process goes to Step S106.

In Step S106, the contact determination unit 314 determines whether the detected first external force is greater than the magnitude F3 (the first threshold value). In other words, the contact determination unit 314 determines whether the robot 200 is determined to have any contact object.

The respective contact detection sensors 231 to 236 detect the first external force applied to the robot 200 in the first state in Step S106. If the first external force has the magnitude F1 greater than the first threshold value, the contact determination unit 314 determines that the robot 200 has the contact object. The external force applied to the robot 200 in the first state is, for example, the external force applied to the robot 200 by the person or the external force caused by contact with another robot.

Step S107 to Step S111 correspond to the flow from Step S4 to the case in which the external force is continuously detected in Step S6 in the second embodiment. If the contact determination unit 314 determines that the robot 200 has the contact object (YES in Step S106), the process goes to Step S107. In Step S107, the controller 300 finally stops the driving of the robot 200 while performing deceleration control of the operation of the robot 200.

If the data generation unit 313 and the contact determination unit 314 determine in Step S105 that the first external force applied to the robot 200 is not detected, the controller 300 is set so that it is determined that the robot 200 has no contact object. This flow corresponds to No in Step S105. In this case, the process goes back to Step S104 from Step S105.

If the first external force detected in Step S105 has the magnitude F2 smaller than the first threshold value in Step S106, the controller 300 is set so that it is determined that the robot 200 has no contact object. This flow corresponds to NO in Step S106. In this case, the process goes back to Step S104 from Step S106.

In Step S108, the controller 300 switches the robot 200, the driving of which is stopped in Step S107, to a state in which the orientation change in accordance with second external force is performed. The state in which the robot 200 performs the orientation change in accordance with the second external force is referred to as the second state. The external force applied to the robot 200 in the second state is, for example, the external force applied to the robot 200 by the person or the external force caused by contact with another robot.

At this time, the lamp may be turned on or display on the operation device may be performed in order to indicate to people around the robot 200 that the robot 200 is in the state in which the orientation change in accordance with the external force is performed. The state in which the orientation change in accordance with the external force is performed is a state in which the orientation change of the robot 200 is available but the orientation change of the robot 200 has not been performed.

The controller 300 is capable of changing the orientation of the robot 200 while changing the response characteristics to the external force by performing the impedance control to the robot 200 in the second state. Specifically, the controller 300 is capable of changing the orientation of the robot 200 while varying the sense of force of the person when the external force is applied to the robot 200 by varying the rigidity or the viscosity, which is the parameter in the impedance control.

Decreasing at least one of the rigidity and the viscosity in the impedance control enables the robot 200 in the non-movement state to be switched to the state in which the orientation change in accordance with the external force is available.

In Step S109, the data generation unit 313 and the contact determination unit 314 determine whether the respective contact detection sensors 231 to 236 detect the second external force applied to the robot 200 in the second state.

If the data generation unit 313 and the contact determination unit 314 determine that the respective contact detection sensors 231 to 236 detect the second external force applied to the robot 200 in the second state (YES in Step S109), the data generation unit 313 and the contact determination unit 314 acquire the contact information. Then, the process goes to Step S110 in FIG. 5B.

In Step S110, it is determined whether the second external force is greater than a second threshold value. If the second external force detected in Step S109 has a magnitude F4 (YES in Step S110), the process goes to Step S111. In Step S111, the robot 200 starts the orientation change in accordance with the external force.

At this time, the lamp may be turned on or display on the operation device may be performed in order to indicate to people around the robot 200 that the orientation change in accordance with the external force is being performed. The state in which the orientation change in accordance with the external force is being performed is a state in which the robot 200 is performing the orientation change.

If the second external force detected in Step S109 has a magnitude F5 (NO in Step S110), the process goes to Step S119 in FIG. 5B. In Step S119, the driving of the robot 200 is stopped.

Specifically, the threshold value corresponding to a magnitude F6 (the second threshold value) of the external force is set and the process goes to Step S111 or Step S119 based on whether the external force detected in Step S109 is determined in Step S110 to be greater or smaller than the magnitude F6, which is the threshold value. The controller 300 compares the value corresponding to the magnitude of the external force applied to the robot 200 with the threshold value.

The magnitude F6, which is the threshold value, is smaller than the magnitude F4 and is greater than the magnitude F5 (F4>F6>F5). Whether the process goes to Step S111 or Step S119 if the external force equal to the magnitude F6, which is the threshold value, is detected may be appropriately set.

The controller 300 may vary the magnitude F6 between the value corresponding to the magnitude F4 and the value corresponding to the magnitude F5.

Step S112 to Step S118 correspond to the flow from Step S7 to Step S10 in the second embodiment. After the orientation change of the robot 200 is started, in Step S112, the controller 300 detects the object 400 existing in the movable area of the robot 200, which is performing the orientation change in accordance with the external force. Here, the object 400 is an obstacle, such as a person, another robot, or equipment, which exists in the movable area of the robot 200.

After the controller 300 detects the object 400 in Step S112, the process goes to Step S113. In Step S113, the robot 200 acquires the distance to the detected object 400 based on the object information analyzed by the object information processing unit 312. Here, the object information processing unit 312 calculates the distance between the robot 200 and the object 400, in consideration of information about the presence of the object 400, the size of the object 400, and so on, and adds the calculated distance to the object information acquired in Step S102.

In Step S114, the controller 300 determines whether the distance between the robot 200 and the object 400, acquired in Step S113, is longer than a predetermined distance.

If the distance between the robot 200 and the object 400 is shorter than or equal to the predetermined distance and is longer than zero (NO in Step S114), the process goes to Step S117. In Step S117, the controller 300 increases at least one of the rigidity and the viscosity in the impedance control to restrict the orientation change of the robot 200. The state in which the orientation change is restricted is referred to as the third state.

Increasing at least one of the rigidity and the viscosity in the impedance control enables the orientation change of the robot 200 that is performing the orientation change in accordance with the external force to be restricted.

For example, only the rigidity in the impedance control may be decreased in Step S108 and only the viscosity in the impedance control may be increased in Step S117. In contrast, only the viscosity in the impedance control may be decreased in Step S108 and only the rigidity in the impedance control may be increased in Step S117.

The parameters in the impedance control are set so that the load occurring when the person presses the robot 200 is gradually increased as the robot 200 comes closer to the object 400. The state in which the load is gradually increased is a state in which the rigidity and the viscosity in the impedance control are increased as the robot 200 comes closer to the object 400. The state in which the rigidity and the viscosity in the impedance control are increased as the robot 200 comes closer to the object 400 is referred to as a fourth state.

The fourth state is a state in which the distance between the robot 200 and the object 400 is shorter than or equal to the predetermined distance and is longer than zero and the robot 200 is moving in the direction in which the object 400 exists, in the third state in which the orientation change of the robot 200 is restricted.

The robot 200 is in the second state in which the orientation change in accordance with the external force is performed if the distance between the robot 200 and the object 400 is shorter than or equal to the predetermined distance and is longer than zero and the robot 200 is not moving in the direction in which the object 400 exists.

In other words, the orientation change is not performed in the direction in which the robot 200 approaching the object 400. The same applies to a case in which the distance to the singular point is shorter than or equal to a predetermined distance and is longer than zero and the orientation change is being performed in a direction in which the robot 200 comes closer to the singular point. Specifically, the robot 200 is switched to the third state and is switched to the fourth state in which the rigidity and the viscosity in the impedance control are gradually increased as the robot 200 comes closer to the singular point.

The orientation change is restricted only when the orientation change is performed in the direction in which the robot 200 comes closer to the object 400 or the direction in which the robot 200 comes closer to the singular point and the width of the orientation change of the robot 200 in accordance with the external force may be set in advance.

In other words, setting the upper limit distance of the orientation change of the robot 200 in the second state to, for example, 30 cm in advance enables the orientation change that is not expected by the person to be suppressed.

Alternatively, the time period during which the orientation change in accordance with the external force is available may be set in advance.

If the distance to the object 400 is longer than the predetermined distance (YES in Step S114), the process goes back to Step S112. Repeating the flow from Step S112 to Step S114 constantly updates the information about the object existing in the movable area of the robot 200 to perform the orientation change. As a result, it is possible to address a case in which the person enters the movable area of the robot 200 during the orientation change and a case in which an object falls down and enters the movable area of the robot 200 during the orientation change. Whether the process goes back to Step S112 or goes to Step S117 if the distance between the robot 200 and the object 400 is equal to the predetermined distance may be appropriately set.

When the robot 200 is attempted to be moved during the orientation change in accordance with the external force using a unit, such as the operation device, which changes the orientation of the robot 200 without being in contact with the robot 200, priority is given to the orientation change in accordance with the external force. Accordingly, the controller 300 ignores a robot driving instruction with the operation device. This is to prevent the orientation change of the robot 200 in a direction that is not intended by the person who presses the robot 200 due to the orientation change of the robot 200 in response to an external instruction with the operation device.

In Step S115, the orientation change control unit 315 acquires the speed of the orientation change of the robot 200, the orientation change of which in accordance with the external force has been started in Step S111.

If it is determined in Step S116 that the speed of the orientation change, acquired by the orientation change control unit 315, is a speed V1 (YES in Step S116), the process goes to Step S117. In Step S117, the controller 300 switches the robot 200 to the third state so that the load occurring when the person presses the robot 200 is increased.

If it is determined in Step S116 that the speed of the orientation change, acquired by the orientation change control unit 315, is a speed V2 (NO in Step S116), the process goes back to Step S115. In Step S115, the orientation change control unit 315 acquires the speed of the orientation change of the robot 200 again.

Specifically, the threshold value corresponding to a speed V3 (a third threshold value) of the orientation change is set and the process goes to Step S117 or goes back to Step S115 based on whether the speed of the orientation change acquired in Step S115 is determined in Step S116 to be higher or lower than the speed V3, which is the threshold value.

The speed V3, which is the threshold value, is lower than the speed V1 and is higher than the speed V2 (V1>V3>V2). Whether the process goes to Step S117 or goes back to Step S115 if the speed equal to the speed V3, which is the threshold value, is detected may be appropriately set.

It is possible to prevent the robot 200 from changing the orientation at an excessive speed and to suppress excessive contact between the robot 200 and the object 400 around the robot 200 even if the robot 200 collides with the object 400 around the robot 200 in the above manner.

After restricting the orientation change in Step S117, in Step S118, the robot 200 performs a return operation. The return operation is performed by the controller 300, which instructs the return operation.

In the return operation, it is determined whether the robot 200 is currently positioned in an operation range that is set in advance and the robot 200 returns from the position after the orientation change to a predetermined return position.

If the robot 200 is positioned outside the set operation range, the controller 300 instructs the robot 200 to return to the point at which the driving of the robot 200 is stopped in Step S107 along a trajectory resulting from inversion of the trajectory of the movement in the orientation change from the point where the driving of the robot 200 is stopped and, then, to return to the predetermined return position.

Since the trajectory of the movement in the orientation change is recorded in the controller 300, the robot 200 is capable of returning to the predetermined return position along the trajectory resulting from inversion of the trajectory of the movement. A method similar to the method of storing the trajectory of the orientation change in direct teaching may be adopted as the method of storing the trajectory in the return operation. Returning to the predetermined return position by the inversion operation enables the return along the trajectory on which the object 400 does not exist to suppress the contact between the robot 200 and the object 400 around the robot 200.

Alternatively, the controller 300 may instruct the robot 200 to move to the operation range that is set along a calculated minimum path which is closer to the point where the driving of the robot 200 is stopped and which the object 400 does not exist in the set operation range and, then, to return to the predetermined return position.

The controller 300 may determine whether the current position of the robot 200 is within the operation range that is set and, if the current position of the robot 200 is within the operation range that is set, the controller 300 may instruct the robot 200 to return from the current position to the predetermined return position.

Also during the return operation, the object detection sensor 311 detects the object 400. The acquired object information is analyzed by the object information processing unit 312 to calculate the distance between the robot 200 and the object 400 and the distance is supplied to the orientation change control unit 315 to enable the robot 200 to reliably return to the predetermined return position.

If the data generation unit 313 and the contact determination unit 314 determine that the respective contact detection sensors 231 to 236 do not detect the second external force (NO in Step S109) or if the detected second external force has the magnitude F5 smaller than the second threshold value (NO in Step S110), the process goes to Step S119. In Step S119, the orientation change in accordance with the external force is not performed and the orientation change of the robot 200 is stopped. Here, the second threshold value may be appropriately set by the user depending on the used method. The lamp may be turned on or display on the operation device may be performed in order to indicate to people around the robot 200 that the robot 200 is in any of the first state, the second state, the third state, and the fourth state. The operation device is, for example, the teaching pendant or the operation panel.

Step S119 to Step S126 corresponds to the flow when the external force is not continuously detected in Step S6 in the second embodiment. In Step S120, it is determined whether any operation with the operation device is performed to the robot 200 the orientation change of which is stopped in Step S119.

If it is determined that the operation with the operation device is performed (YES in Step S120), the process goes to Step S122. In Step S122, the robot 200 is switched from the second state in which the orientation change in accordance with the external force is performed to a normal stopped state. The normal stopped state is a state in which application of the external force to the robot 200 is not supposed and the controller 300 can be in an error state. In Step S123, it is determined whether the external force is applied to the robot 200 in the normal stopped state. If it is determined that the external force is applied to the robot 200 in the normal stopped state (YES in Step S123), the process goes to Step S124.

If the contact determination unit 314 determines in Step S124 that the detected external force has a magnitude F7 (YES in Step S124), the process goes to Step S125. In Step S125, the controller 300 is in the error state. In the error state, it is sufficient to indicate to people around the robot 200 that the controller 300 is in the error state. For example, an alarm may be sounded.

If the contact determination unit 314 determines in Step S124 that the detected external force has a magnitude F8 (NO in Step S124), the process goes to Step S126. In Step S126, the controller 300 instructs the robot 200 to perform the return operation, as in Step S118.

Specifically, the threshold value corresponding to a magnitude F9 (a fourth threshold value) of the external force is set and the process goes to Step S125 or Step S126 based on whether the external force detected in Step S123 is determined in Step S124 to be greater than or smaller than the magnitude F9, which is the threshold value.

The magnitude F9, which is the threshold value, is smaller than the magnitude F7 and is greater than the magnitude F8 (F7>F9>F8). Whether the process goes to Step S125 or Step S126 if the external force equal to the magnitude F9, which is the threshold value, is detected may be appropriately set.

If it is determined that no operation with the operation device is performed to the robot 200 (NO in Step S120), the process goes to Step S121 in FIG. 5B. In Step S121, it is determined whether the external force is not detected for a predetermined time period.

If the time period during which no external force is detected for the robot 200 the orientation change of which is stopped is longer than the predetermined time period (YES in Step S121), the process goes to the normal stopped state in Step S122.

If the external force is detected before the predetermined time elapsed (NO in Step S121), the process goes back to Step S109. In Step S109, the robot 200 switches to the second state in which the orientation change in accordance with the external force is performed.

If no external force is applied to the robot 200 (NO in Step S123) or if the detected external force has the magnitude F8 smaller than the fourth threshold value (NO in Step S124), the process goes to Step S126. In Step S126, the controller 300 instructs the robot 200 to perform the return operation, as in Step S118. At this time, the fourth threshold value may be appropriately set by the user depending on the used method.

Fourth Embodiment

A fourth embodiment will now be described with reference to FIG. 6.

Figure 6:
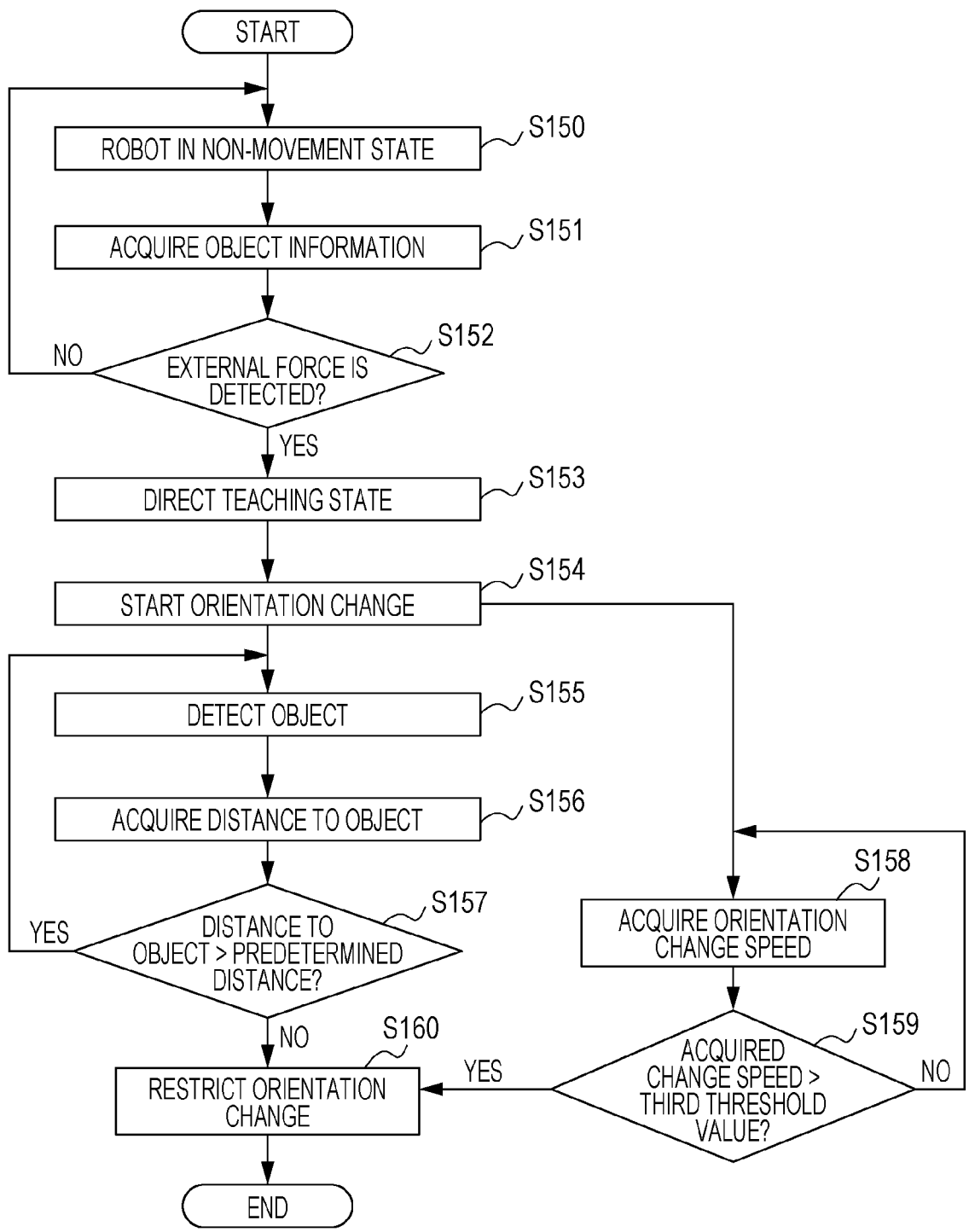
FIG. 6 is a flowchart illustrating the content of control in the system in a fourth embodiment.

FIG. 6 is a flowchart illustrating a process when the direct teaching is performed to the robot 200.

Referring to FIG. 6, at the start of the flowchart in FIG. 6, the robot 200 is turned off and the joint shafts 201 to 206 are fixed.

In Step S150, the robot 200 is turned on but the robot 200 is in the non-movement state. The non-movement state in Step S150 is the state in which the electric motors support the deadweight of the robot 200. In other words, the non-movement state is the state in which the electric motors prevent the robot 200 from changing the orientation due to the gravity applied to each component of the robot 200.

The state in which the electric motors support the deadweight of the robot 200 and the robot 200 is in the non-movement state is referred to as the first state.

In Step S151, the object detection sensor 311 acquires the information about the object 400 existing in the movable area of the robot 200. The singular point of the robot 200 is also stored as the object information here.

In Step S152, the data generation unit 313 and the contact determination unit 314 determine whether the respective contact detection sensors 231 to 236 detect the external force applied to the robot 200 in the first state.

If the data generation unit 313 and the contact determination unit 314 determine that the respective contact detection sensors 231 to 236 do not detect the external force, the controller 300 is set so that it is determined that the robot 200 has no contact object. This flow corresponds to NO in Step S152. In this case, the process goes back to Step S150 from Step S152. In Step S150, the non-movement state is continued.

If the data generation unit 313 and the contact determination unit 314 determine that the respective contact detection sensors 231 to 236 detect the external force applied to the robot 200 in the first state (YES in Step S152), the process goes to Step S153. In Step S153, the robot 200 is in a state in which the direct teaching to the robot 200 by the person is available. The state in which the direct teaching is available is a state in which the orientation of the robot 200 is capable of being changed by the person who directly touches the robot 200 and in which the robot 200 performs the orientation change in accordance with the detected external force and the path of the orientation change is recorded. This state is referred to as the second state.

In Step S154, the orientation change is started upon application of the external force to the robot 200 by the person.

After the object 400 is detected in Step S155, the process goes to Step S156. In Step S156, the object information processing unit 312 acquires the distance to the detected object 400. Here, the object information processing unit 312 calculates the distance between the robot 200 and the object 400, in consideration of information about the presence of the object 400, the size of the object 400, and so on, and adds the calculated distance to the object information acquired in Step S151.

As in the third embodiment, in Step S157, the object information processing unit 312 determines whether the distance between the robot 200 and the object 400, acquired in Step S156, is longer than a predetermined distance that is greater than zero. Determination of whether the distance between the robot 200 and the singular point of the robot 200 is longer than a predetermined distance is also performed here.

If the object information processing unit 312 determines that the distance between the robot 200 and the object 400 or the distance between the robot 200 and the singular point is shorter than the predetermined distance and is greater than zero (NO in Step S157), the process goes to Step S160. In Step S160, the controller 300 increases at least one of the rigidity and the viscosity, which are the parameters in the impedance control, to restrict the orientation change of the robot 200. The state in which the orientation change is restricted is referred to as the third state.

If the object information processing unit 312 determines that the distance between the robot 200 and the object 400 is longer than the predetermined distance (YES in Step S157), the process goes back to Step S155. Repeating the flow from Step S155 to Step S157 constantly updates the information about the object existing in the movable area of the robot 200 to perform the orientation change. This enables contact between the robot 200 and the object 400 around the robot 200 to be suppressed.

After starting the orientation change in accordance with the external force in Step S154, in Step S158, the orientation change control unit 315 acquires the speed of the orientation change of the robot 200.

In Step S159, the orientation change control unit 315 determines whether the acquired speed exceeds the third threshold value.

If the speed of the orientation change is the speed V1 higher than the third threshold value (YES in Step S159), the process goes to Step S160. In Step S160, the controller 300 sets the parameters in the impedance control so that the load occurring when the person presses the robot 200 is gradually increased.

If the speed of the orientation change is the speed V2 lower than the third threshold value (NO in Step S159), the process goes back to Step S158. In Step S158, the orientation change control unit 315 acquires the speed of the orientation change again. The third threshold value may be appropriately set by the user depending on the used method.

It is possible to prevent the robot 200 from changing the orientation at an excessive speed and to suppress contact between the robot 200 and the object around the robot 200 even if the robot 200 collides with the object around the robot 200 in the above manner.

The system 100 of the fourth embodiment is applicable to a manufacturing method performed in cooperation between the system 100 of the fourth embodiment and a manufacturer. The manufacturing method may include manufacturing steps including processing of an article, movement of an article, and so on. The orientation of the robot 200 is capable of being changed by the manufacturer, who touches the robot 200 and applies the external force to the robot 200 during the steps.

The system 100 of the fourth embodiment is also applicable to a manufacturing method in which the orientation of the robot 200 is changed upon application of the external force to the robot 200 that holds an article and the orientation change of the robot 200 is restricted when the orientation change has been completed to a target point that is set in advance.

The embodiments of the present disclosure may include the program 320 causing the computer to perform the method of manufacturing the robot 200. The embodiments of the present disclosure may include a recording medium on which the program 320 is recorded.

According to the present disclosure, it is possible to provide a technique that is advantageous to improvement of the operation of the robot when the external force applied to the robot is detected.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

The embodiments described above may be appropriately modified within the technical idea of the present disclosure. For example, combination of multiple embodiments may be available. In addition, part of matters in at least one embodiment may be deleted or replaced. Furthermore, a new matter may be added to at least one embodiment.

The disclosure of this specification includes not only the matters explicitly described in the specification but also all the matters understandable from the specification and the drawings appended to the specification. The disclosure of this specification includes a complement of individual concepts described in the specification. Specifically, for example, when "A is greater than B" is described in the specification, the specification discloses the fact that "A is not greater than B" even if "A is not greater than B" is not described. This is because it is assumed the case in which "A is not greater than B" when "A is greater than B" is described.

While the present invention has been described with reference to embodiments, it is to be understood that the invention is not limited to the disclosed embodiments but is defined by the scope of the following claims.

This application claims the benefit of Japanese Patent Application No. 2021-020053, filed Feb. 10, 2021 and No. 2021-188735, filed Nov. 19, 2021, which are hereby incorporated by reference herein in their entirety.

What is claimed is:

1. A system comprising:
a robot; and
a controller configured to control the robot,
wherein the controller is configured to switch the robot from a first state to a second state in which orientation change in accordance with external force applied to the robot is more tolerated than the first state based on detection of contact of an object with the robot, and
wherein the controller is configured to switch the robot from the second state to a third state in which the orientation change in accordance with the external force applied to the robot is more restricted than the second state after the orientation change in accordance with the external force is started and while the external force is being applied to the robot,
wherein the controller is configured to switch the robot in the third state to a fourth state in which the orientation change in accordance with the external force is more restricted than the third state.

2. The system according to claim 1,
wherein the controller is configured to stop the robot performing the orientation change if the robot is performing the orientation change when the controller detects the contact with the robot.

3. The system according to claim 1,
wherein the controller is configured to detect the contact if the external force of a first magnitude is detected, and
wherein the robot is configured to continue in the first state if the external force of a second magnitude smaller than the first magnitude is detected.

4. The system according to claim 1,
wherein the robot is configured to perform the orientation change based on a teaching operation and perform the orientation change in accordance with the external force between completion of the teaching and switching from the second state to the third state.

5. The system according to claim 1,
wherein the controller is configured to switch the robot from the second state to the third state if a distance between the robot in the state in which the orientation change in accordance with the external force is performed and an obstacle in a movable area of the robot, which is detected by an obstacle detection sensor, or a distance between the robot in the state in which the orientation change in accordance with the external force is performed and a singular point of the robot, is a second distance that is shorter than a first distance and that is greater than zero.

6. The system according to claim 1,
wherein the controller is configured to switch the robot in the second state to the third state in which the orientation change in accordance with the external force is more restricted than the second state if the robot performs the orientation change in accordance with the external force at a first speed and continue the second state if the robot performs the orientation change in accordance with the external force at a second speed slower than the first speed.

7. The system according to claim 1,
wherein the controller is configured to acquire information about an obstacle existing in a movable area of the robot, which is detected by an obstacle detection sensor, while the robot is changing the orientation in accordance with the external force.

8. The system according to claim 1,
wherein the controller is configured to start the orientation change of the robot in accordance with the external force if the external force of a first magnitude is detected and keeps the orientation of the robot if the external force of a second magnitude smaller than the first magnitude is detected.

9. The system according to claim 1, further comprising:
an operation device configured to be connected to the controller,
wherein the robot performs the orientation change based on an instruction with the operation device and wherein the controller includes a unit that indicates that the robot is changing the orientation.

10. The system according to claim 1,
wherein the controller instructs the robot to perform a return operation from a position after the orientation change of the robot to a return position recorded in the controller, the return operation includes an operation along a trajectory resulting from inversion of a trajectory of the orientation change.

11. The system according to claim 1,
wherein the controller instructs the robot to perform a return operation from a position after the orientation change of the robot to a return position recorded in the controller, the controller updates information about an obstacle existing in a movable area of the robot during the return operation.

12. A method of manufacturing an article, the method comprising:
manufacturing an article in cooperation between a robot and a manufacturer of the article using the system according to claim 1,
wherein after detecting the contact of the manufacturer with the robot changing an orientation, the robot changes the orientation in accordance with external force applied to the robot by the manufacturer,
wherein the robot performs orientation change in accordance with external force, and
wherein the robot is restricted, while the external force is being applied to the robot, to change orientation in accordance with external force applied to the robot more than during changing orientation in accordance with external force applied to the robot.

13. A method comprising:
controlling a robot,
wherein at least one of rigidity and viscosity in impedance control in the robot is decreased based on detection of contact of an object with the robot, and
wherein at least one of the rigidity and the viscosity in the impedance control is increased while external force is being applied to the robot,
wherein a controller is configured to switch the robot in the third state to a fourth state in which the orientation change in accordance with the external force is more restricted than the third state.

14. The method according to claim 13,
wherein the controller switches the robot from a first state to a second state in which orientation change in accordance with external force applied to the robot is more tolerated than the first state based on detection of contact of an object with the robot by decreasing at least one of rigidity and viscosity in impedance control in the robot,
wherein the robot performs orientation change in accordance with external force, and
wherein the controller switches the robot from the second state to a third state in which orientation change in accordance with external force applied to the robot is more restricted than the second state based on detection of contact of an object with the robot by increasing at least one of rigidity and viscosity in the impedance control after the orientation change in accordance with the external force is started and while the external force is being applied to the robot.

15. A non-transitory computer-readable medium storing a program causing a computer to perform the method according to claim 13.

16. The system according to claim 1,
wherein, after the contact of an obstacle with the robot has been detected, the robot being under the orientation change stops the orientation change.

17. The system according to claim 11,
wherein the return operation includes an operation along a trajectory resulting from inversion of a trajectory of the orientation change.

18. A system comprising:
a robot; and
a controller configured to control the robot,
wherein the controller is configured to switch the robot from a first state to a second state in which orientation change in accordance with external force applied to the robot is more tolerated than the first state based on detection of contact of an object with the robot, and
wherein the controller is configured to switch the robot from the second state to a third state in which the orientation change in accordance with the external force applied to the robot is more restricted than the second state after the orientation change in accordance with the external force is started and while the external force is being applied to the robot,
wherein the controller is configured to start the orientation change of the robot in accordance with the external force if the external force of a first magnitude is detected and keeps the orientation of the robot if the external force of a second magnitude smaller than the first magnitude is detected.

19. The system according to claim 18,
wherein the controller is configured to stop the robot performing the orientation change if the robot is performing the orientation change when the controller detects the contact with the robot.

20. The system according to claim 18,
wherein the controller is configured to detect the contact if the external force of the first magnitude is detected, and
wherein the robot is configured to continue in the first state if the external force of the second magnitude smaller than the first magnitude is detected.

21. The system according to claim 18,
wherein the robot is configured to perform the orientation change based on a teaching operation and perform the orientation change in accordance with the external force between completion of the teaching and switching from the second state to the third state.

22. The system according to claim 18,
wherein the controller is configured to switch the robot from the second state to the third state if a distance between the robot in the state in which the orientation change in accordance with the external force is performed and an obstacle in a movable area of the robot, which is detected by an obstacle detection sensor, or a distance between the robot in the state in which the orientation change in accordance with the external force is performed and a singular point of the robot, is a second distance that is shorter than a first distance and that is greater than zero.

23. The system according to claim 18,
wherein the controller instructs the robot to perform a return operation from a position after the orientation change of the robot to a return position recorded in the controller, the controller updates information about an obstacle existing in a movable area of the robot during the return operation.

24. The system according to claim 18,
wherein the controller is configured to switch the robot in the third state to a fourth state in which the orientation change in accordance with the external force is more restricted than the third state.

25. The system according to claim 18,
wherein the controller is configured to acquire information about an obstacle existing in a movable area of the robot, which is detected by an obstacle detection sensor, while the robot is changing the orientation in accordance with the external force.

26. The system according to claim 18, further comprising:
an operation device configured to be connected to the controller,
wherein the robot performs the orientation change based on an instruction with the operation device and wherein the controller includes a unit that indicates that the robot is changing the orientation.

27. The system according to claim 18,
wherein the controller instructs the robot to perform a return operation from a position after the orientation change of the robot to a return position recorded in the controller, the return operation includes an operation along a trajectory resulting from inversion of a trajectory of the orientation change.

28. The system according to claim 18,
and keeps the orientation of the robot if the external force of a fifth magnitude smaller than the fourth magnitude is detected.

29. The system according to claim 28,
wherein the return operation includes an operation along a trajectory resulting from inversion of a trajectory of the orientation change.

30. A method of manufacturing an article, the method comprising:
manufacturing an article in cooperation between a robot and a manufacturer of the article using the system according to claim 18,
wherein after detecting the contact of the manufacturer with the robot changing an orientation, the robot changes the orientation in accordance with external force applied to the robot by the manufacturer,
wherein the robot performs orientation change in accordance with external force, and
wherein the robot is restricted, while the external force is being applied to the robot, to change orientation in accordance with external force applied to the robot more than during changing orientation in accordance with external force applied to the robot.

31. The system according to claim 18,
wherein, after the contact of an obstacle with the robot has been detected, the robot being under the orientation change stops the orientation change.

32. A method comprising:
controlling a robot,
wherein at least one of rigidity and viscosity in impedance control in the robot is decreased based on detection of contact of an object with the robot, and
wherein at least one of the rigidity and the viscosity in the impedance control is increased while external force is being applied to the robot,
wherein a controller is configured to start the orientation change of the robot in accordance with the external force if the external force of a first magnitude is detected and keeps the orientation of the robot if the external force of a second magnitude smaller than the first magnitude is detected.

33. The method according to claim 32,
wherein the controller switches the robot from a first state to a second state in which orientation change in accordance with external force applied to the robot is more tolerated than the first state based on detection of contact of an object with the robot by decreasing at least one of rigidity and viscosity in impedance control in the robot,
wherein the robot performs orientation change in accordance with external force, and
wherein the controller switches the robot from the second state to a third state in which orientation change in accordance with external force applied to the robot is more restricted than the second state based on detection of contact of an object with the robot by increasing at least one of rigidity and viscosity in the impedance control after the orientation change in accordance with the external force is started and while the external force is being applied to the robot.

34. A non-transitory computer-readable medium storing a program causing a computer to perform the method according to claim 32.

* * * * *